United States Patent [19]
Furu

[11] Patent Number: 5,138,582
[45] Date of Patent: Aug. 11, 1992

[54] METHOD AND A DEVICE FOR STABILIZING SOURCES OF SEISMIC ENERGY

[75] Inventor: Harald Furu, Billingstad, Norway
[73] Assignee: Geco A.S., Stavanger, Norway
[21] Appl. No.: 729,345
[22] Filed: Jul. 12, 1991
[30] Foreign Application Priority Data
Jul. 12, 1990 [NO] Norway .................. 903110
[51] Int. Cl.⁵ ............... G01V 1/38; B63G 8/14
[52] U.S. Cl. ................................ 367/16; 114/245
[58] Field of Search ............ 114/245; 367/16–18, 367/19, 20, 144

[56] References Cited
U.S. PATENT DOCUMENTS

| | | | |
|---|---|---|---|
| 4,686,660 | 8/1987 | Gjestrum et al. | 114/253 |
| 4,721,180 | 1/1988 | Haughland et al. | 367/16 |
| 4,831,599 | 5/1989 | Dragsund et al. | 367/15 |
| 4,862,422 | 8/1989 | Brac | 367/19 |

Primary Examiner—Ian J. Lobo
Attorney, Agent, or Firm—Fleit, Jacobson, Cohn, Price, Holman & Stern

[57] ABSTRACT

In seismic surveys at sea a system for maintaining the sources of seismic energy (2) at the same level when emitting their signals includes sensors (5) provided close to the sources of energy (2) for emitting signals representing pressure conditions and/or motion transmitted to a control unit (9). These signals are compared by control unit (9) for controlling driving devices (6) for the suspension lines (3) for the sources of seismic energy (2), so that their distances from the surface of the sea may be controlled to keep all sources (2) at the same level.

5 Claims, 2 Drawing Sheets

METHOD AND A DEVICE FOR STABILIZING SOURCES OF SEISMIC ENERGY

BACKGROUND OF THE INVENTION

The present invention relates to a method for stabilizing sources of seismic energy in connection with marine seismic surveys where seismic sources are towed behind a vessel and are suspended below a buoyancy unit from lines the lengths of which may be adapted by actuation of a driving member.

The invention also relates to a device for utilization with such a method.

In marine seismic surveys seismic pulses are emitted from one or more sources of energy which are towed in the water, suspended from the buoyancy means. Seismic surveys have the object of providing data which describe the subterranean stratifications with the best possible accuracy. For this purpose pulses with adapted frequencies are emitted from the sources of seismic energy, so that the signal penetrates the crust of the earth and is partly reflected by various strata. The corresponding reflections are detected by the aid of a seismic receiver cable, a so called streamer, which may have a length of several thousand meters.

Sources of seismic energy commonly constitute so called air, gas or water guns. In surveying shallow waters sources which discharge an electrical plug are also used.

In such surveys, with a series of seismic guns being towed, one behind the other in the water, and where the emitted signals are to be reflected by various geological strata which are distributed across large areas, a great amount of background noise will appear, and a series of inaccuracies of measurements will result both on the emitter side and on the receiver side. Previous efforts were mainly directed to avoid background noise and to achieve as accurate and clear signals as possible. In this connection inaccuracies due to movement of the water, i.e. wave motion which will especially cause depth displacement of the positions of signal emitters, were ignored. The only connection in which the presence of such wave motion was taken into consideration was the design of the towed body from which the seismic guns are suspended, so as to make such a body glide as smoothly as possible in the sea and, consequently, move in a linear manner. The mentioned principles and associated problems are described in an earlier Norwegian Patent of the applicant's No. 150 016. The same approach to the problem is also found in Norwegian Patent No. 148 762, and in Norwegian Patent No. 16 478.

None of the mentioned concepts, however, provided a satisfactory solution of the problem of inaccurate measurements in heavy sea, since even with the compensation of wave motion achieved by the previously known systems there will still be differences in height between the locations of separate air guns in heavy sea.

With common use of air guns which are placed in groups it is, however, very important that the guns are kept as much as possible at the same level during firing. In case of, e.g. air guns which are mutually adapted to be considered a point firing source (as disclosed in Norwegian Patent No. 147 655), motion during firing operations, caused by wave action or another corresponding noise interference, will cause the emitted impulse to change its character from one shot to the next.

BRIEF SUMMARY OF THE INVENTION

It is, thus, an object of the invention to provide a method and a device permitting sources of seismic energy, at least sources of one group, to be kept at a desired level in the water and, furthermore, to permit a predetermined, previous level to be maintained.

This object is achieved by a method and a device which are characterized by the features of the invention wherein pressure or motion sensors known per se are used closely to each source of energy to record the depth level of each respective source. Signals from sensors 5 are transmitted then to a control a driving means which activates a drive mechanism for each suspension line to cause adjustment of the suspension lines of the sources in order to maintain them at the desired level. By carrying out such recordings of the depth level continuously the sources of energy may also continuously be lowered/raised and a desired level can be maintained. This means that all seismic signals are emitted from the same distance above the sea floor, so that measurements may be correlated and sources of error due to deviation of the position of seismic impulse emission are eliminated.

BRIEF DESCRIPTION OF THE DRAWING

The invention is disclosed in more detail below with reference to embodiments which are diagrammatically illustrated in the accompanying drawings, wherein.

DETAILED DESCRIPTION

Figure 1:
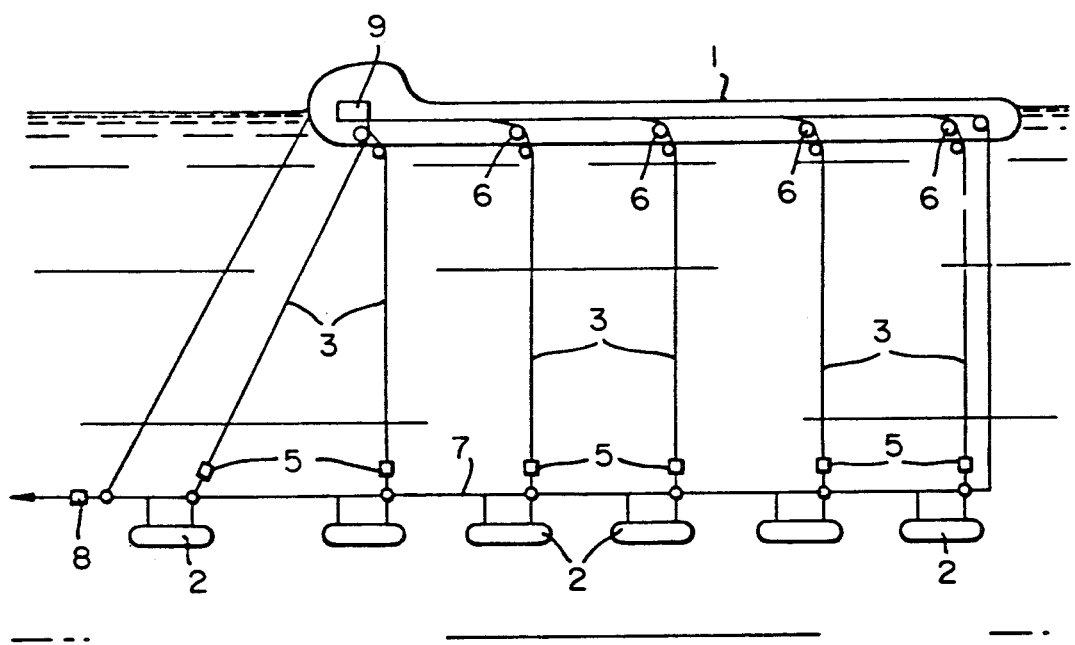
FIG. 1 a schematic elevational view which shows the principle of a first embodiment of the invention.

In FIG. 1 a group of sources of seismic energy, e.g. air guns 2, is illustrated in a general and diagrammatical manner, with the air guns being suspended from a towed body or buoyancy member 1 which is towed behind a vessel. The towing arrangement is not illustrated, since it must be considered to be generally known technology which is not covered by the invention. Only those elements which may be of importance to the invention are, thus, illustrated. From buoyancy member 1 a number of seismic air guns 2 are suspended, being attached by the aid of suspending lines 3 and being mutually connected by the aid of a line 7. The towed arrangement is towed in the direction of the arrow which is indicated at the left hand side of the Figure.

In each of suspension lines 3 a pressure or motion sensor 5 is provided closely above the source of seismic energy. Sensors 5 emit continuous detection pulses which are transmitted in a manner not shown in detail along line 3 to a control unit 9 which is provided on buoyancy member 1 or on board the towing vessel. Control unit 9 will compare the received pulses with each other and with a predetermined value and will, on the basis of differential values, activate motors 6 of the lines which need adjustment to bring the associated source of energy into a correct position. Motors 6 are in this embodiment provided in the buoyancy member and are, thus, protected against weather conditions. The driving units may be provided with flexible/clutch couplings, which may also be provided in the buoyancy member.

Figure 2:
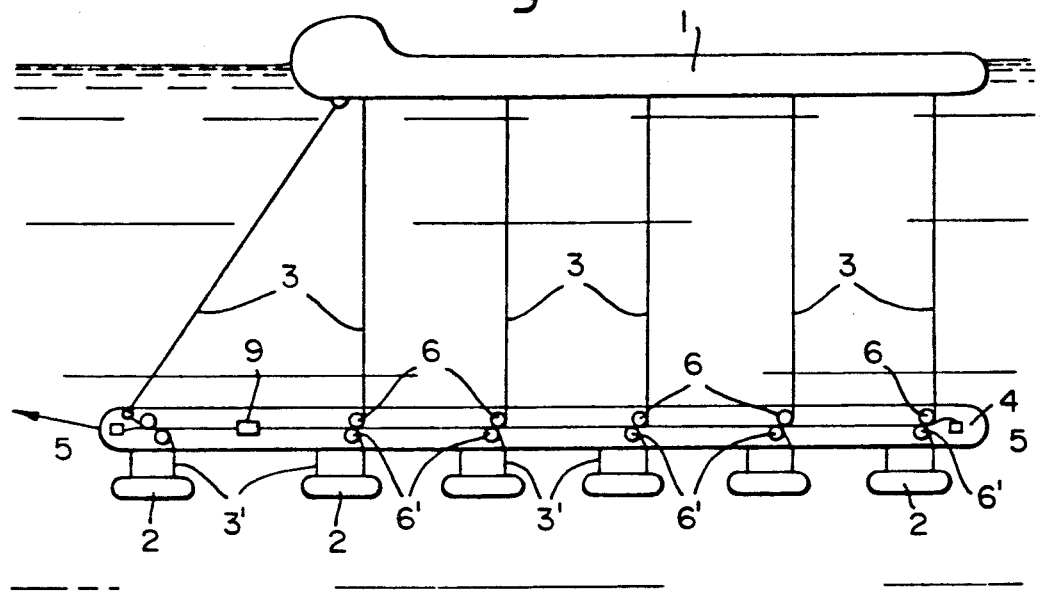
FIG. 2 is a view similar to FIG. 1 which shows a second embodiment with an intermediate section used between the buoyancy member and the seismic sources.

In FIG. 2 another embodiment is illustrated, in which an intermediate section is provided between buoyancy member 1 and the seismic sources 2, which intermediate seismic source support member may be a rigid or a flexible member. Motors 6 with driving units for adjustment of the positions of respective seismic sources may, thus, be provided in the intermediate members 4. Control unit 9 may also be provided in intermediate member 4, or it may be placed in buoyancy means 1 or on the vessel, as before. If intermediate member 4 is rigid, it may be sufficient to provide pressure or motion sensors, e.g. at the end areas of member 4, as indicated at points 5. Based on the measuring results from these points the intermediate member may be raised/lowered by the aid of motors 6, which are activated in cooperation with one another, or the suspensions 3' of the air guns in intermediate member 4 may be lengthened/shortened to achieve the same effect, with motors with winches 6' being activated in the latter case. These two possibilities, obviously, may be combined as well. If the intermediate member 4 is flexible, so that it can adapt to a wave-like movement, activation of driving units 6' will be of most interest.

Figure 3:
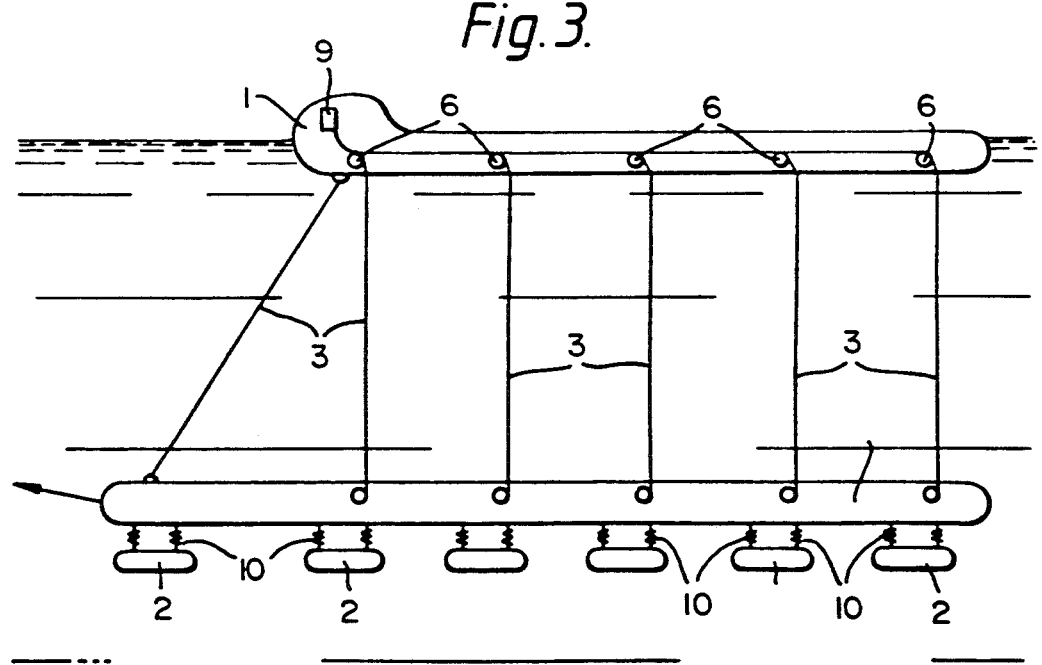
FIG. 3 is a view similar to FIG. 2 which shows a variant of the embodiment thereof.

The third variant shown in the drawings, in FIG. 3, is a modification of FIG. 2, in which an intermediate support member is used. In this case, the driving units comprising motor and winch devices with associated clutches/couplings are again placed in buoyancy member 1 to permit intermediate member 4 to be kept at a desired level and in a horizontal position. Alternatively, the motor and winch devices may also be provided in the intermediate member. Control unit 9 is again placed in the buoyancy member. The difference from the embodiment of FIG. 2 is that there are no special driving units for adjustment of lines 3'. Instead the lines are provided with physical dampening elements to counteract tugs and jerks and will, thus, cause the seismic sources to stay as steadily as possible at the desired level. Such physical dampeners may also be used with the other embodiments.

It is intended that the invention may be used irrespective of the kind of buoyancy member/suspension member used, and many modifications will, thus, be possible within the scope of the invention. The purpose is to dampen noise which propagates down to the source of seismic energy by the aid of the suspension member and to keep the sources of seismic energy stable on the same level. In order to ensure a desired level of the seismic sources, a further sensor 8 may be provided in the towing line of the group of energy sources, as indicated in FIG. 1, which sensor emits signals which may contribute additionally to maintain a stable level of the towed equipment. It will also be understood that the invention is not connected with any special kinds of sources of seismic energy or buoyancy member.

I claim:

1. A method for stabilizing seismic energy sources in marine seismic surveys wherein a buoyancy means is towed behind a vessel, and seismic energy sources are suspended below said buoyancy means by suspension lines adjustable in length by suspension line driving means, the method comprising:

detecting pressure conditions and/or motion of said seismic sources at substantially the same depth thereof relative to the surface of the water;

transmitting signals representing said pressure conditions and/or motion to a control unit; and controlling the driving means by said control unit to adjust the lengths of said suspension lines to maintain said seismic sources at a substantially equal depth.

2. The method as claimed in claim 1 wherein:

separate driving means are provided on said buoyancy means for each individual suspension line and each seismic source is separately suspended from said individual suspension lines and further comprising:

detecting said pressure conditions and/or motion at each individual seismic source;

transmitting separate signals for each seismic source to said control unit;

comparing said separate signals by said control unit; and adjusting the lengths of said individual lines to maintain each separate seismic source at a substantially equal depth.

3. In a marine seismic survey system including a buoyancy means towed by a vessel, a plurality of seismic sources suspended by suspension lines below said buoyancy means, and driving means engaging said suspension lines for adjusting the length thereof, the improvement comprising:

pressure condition and/or motion sensing means disposed adjacent to said seismic sources for sensing pressure conditions at and/or motion of said seismic sources and transmitting signals representing said pressure conditions and/or motions;

control means for receiving said signals from said sensing means, said control means being operatively connected to said driving means, so that said control means in response to said signals from said sensing means controls said driving means to adjust the lengths of said suspension lines to maintain said seismic sources at substantially the same depth.

4. The system as claimed in claim 3 wherein:

a separate suspension line is provided for each of said seismic sources;

a separate driving means is provided for each suspension line;

a separate sensing means is provided on each suspension line adjacent said seismic source suspended thereon;

each sensing means transmits signals to said control unit representing said pressure conditions and/or motion of respective ones of said seismic sources; and said control means compares said signals transmitted from said detecting means and in response thereto adjusts the lengths of said suspension lines to maintain said seismic sources at substantially the same depth.

5. The system as claimed in claim 4 and further comprising:

an intermediate member suspended from and below said buoyancy means by said suspension lines; and said seismic sources are suspended from said intermediate member.

* * * * *